(12) United States Patent
Holtom

(10) Patent No.: US 10,436,174 B2
(45) Date of Patent: Oct. 8, 2019

(54) TURBINE FLUID VELOCITY FIELD MEASUREMENT

(71) Applicant: Wind Farm Analytics Ltd, Glasgow (GB)

(72) Inventor: Theodore Holtom, Glasgow (GB)

(73) Assignee: WIND FARM ANALYTICS LTD, Glasgow (GB)

( * ) Notice: Subject to any disclaimer, the term of this patent is extended or adjusted under 35 U.S.C. 154(b) by 755 days.

(21) Appl. No.: 14/901,664

(22) PCT Filed: Jun. 9, 2014

(86) PCT No.: PCT/GB2014/051770
§ 371 (c)(1),
(2) Date: Dec. 28, 2015

(87) PCT Pub. No.: WO2015/001301
PCT Pub. Date: Jan. 8, 2015

(65) Prior Publication Data
US 2016/0146195 A1 May 26, 2016

(30) Foreign Application Priority Data
Jun. 30, 2013 (GB) .................................. 1311711.4

(51) Int. Cl.
*G01P 3/36* (2006.01)
*F03D 1/06* (2006.01)
(Continued)

(52) U.S. Cl.
CPC ......... *F03D 1/0675* (2013.01); *F03D 1/0691* (2013.01); *F03D 7/0204* (2013.01); *F03D 17/00* (2016.05); *F03D 80/82* (2016.05); *G01P 5/26* (2013.01); *G01S 17/58* (2013.01); *G01S 17/95* (2013.01); *F05B 2270/32* (2013.01); *F05B 2270/804* (2013.01); *Y02A 90/19* (2018.01); *Y02E 10/721* (2013.01); *Y02P 70/523* (2015.11)

(58) Field of Classification Search
CPC ............. F03D 11/0091; F03D 11/0058; F03D 7/0204; F03D 1/0675; F03D 1/0691; F02D 1/0641; F02D 1/0675; G01P 5/26
USPC ........................................................... 356/28
See application file for complete search history.

(56) References Cited

U.S. PATENT DOCUMENTS

| 2006/0162440 A1 | 7/2006 | Martin |
| 2012/0051907 A1 | 3/2012 | Rogers |
| | (Continued) | |

FOREIGN PATENT DOCUMENTS

| EP | 1460266 A3 | 10/2010 |
| GB | 1341841 A | 12/1973 |
| | (Continued) | |

OTHER PUBLICATIONS

UKIPO Search Report, GB1311711.4, date of search Dec. 4, 2013.
(Continued)

*Primary Examiner* — Mark Hellner
(74) *Attorney, Agent, or Firm* — Colby Nipper PLLC

(57) ABSTRACT

A method of three-dimensional Doppler velocimetry applicable to turbines such as wind turbines achieves improved velocimetry by use of various possible convergent beam geometries and employing beam sources mounted on the turbine such as on a wind turbine nacelle, rotor hub or rotor blades.

20 Claims, 7 Drawing Sheets

(51) Int. Cl.
  *G01P 5/26*    (2006.01)
  *G01S 17/58*   (2006.01)
  *G01S 17/95*   (2006.01)
  *F03D 17/00*   (2016.01)
  *F03D 7/02*    (2006.01)
  *F03D 80/80*   (2016.01)

(56) References Cited

U.S. PATENT DOCUMENTS

| | | | | |
|---|---|---|---|---|
| 2012/0056426 A1* | 3/2012 | Van Kuik | ............. | F03D 7/0224 290/44 |
| 2012/0274937 A1* | 11/2012 | Hays | ............. | G01S 17/58 356/337 |
| 2013/0094960 A1* | 4/2013 | Bowyer | ............. | F03D 7/042 416/1 |
| 2013/0162974 A1 | 6/2013 | Dakin | | |
| 2015/0176569 A1* | 6/2015 | Karikomi | ............. | G01M 15/14 702/34 |

FOREIGN PATENT DOCUMENTS

| | | |
|---|---|---|
| GB | 2477529 A | 8/2011 |
| JP | 2005049204 A | 2/2005 |
| JP | 2009300425 | 12/2009 |
| WO | 2011096928 A1 | 8/2011 |

OTHER PUBLICATIONS

International Search Report, PCT/GB2014/051770, dated Sep. 12, 2014.
Byrne et al. A single-headed fibre optic laser Doppler anemometer probe for the measurement of flow angles, Institute of Physics Publishing, Measurement Science and Technology, Meas. Sci. Technol. 15 (2004) 1-8.
Dodin et al. On the motion of small heavy particles in an unsteady flow, Physics of Fluids vol. 16, No. 8 Aug. 2004.
Lakahminarasimha et al. Laser Doppler Velocimeter Measurements in the Yortex Region of a Radial Inflow Turbine, Journal of Propulsion and Power, No. 1 Jan.-Feb. 1992.
RISTIC Laser Doppler Anemometry and its Application in Wind Tunnel Tests, Scientific Technical Review,vol. LVII, No. 3-4, 2007.
"First Office Action", Chinese Application No. 201480035758.7, dated Jan. 17, 2018, 10 pages.
"First Search", Chinese Application No. 2014800357587, Jan. 8, 2018, 1 page.
"Foreign Office Action", Japanese Application No. 2016-522855, dated Jun. 12, 2018, 11 pages.
"International Preliminary Report on Patentability", PCT Application No. PCT/GB2014/051770, dated Jan. 5, 2016, 18 pages.
"Written Opinion", PCT Application No. PCT/GB2014/051770, dated Dec. 31, 2015, 17 pages.
"Foreign Office Action", Japanese Application No. 2016-522855, dated Jun. 4, 2019, 1 page.

* cited by examiner

TURBINE FLUID VELOCITY FIELD MEASUREMENT

RELATED APPLICATIONS

This application is a U.S. national stage entry under 35 U.S.C. § 371 from International PCT application Ser. No. PCT/GB2014/051770 filed Jun. 9, 2014 and entitled "Turbine Fluid Velocity Field Measurement," which itself claims priority and is entitled to the filing date of British application Ser. No. GB 1311711.4 filed Jun. 30, 2013, and entitled "Turbine Fluid Velocity Field Measurement." The contents of the aforementioned applications are incorporated herein by reference.

The present disclosure relates to turbine fluid velocity field measurement, and in particular to new systems and methods for Doppler velocimetry measurement of a fluid velocity field.

BACKGROUND

A turbine is a machine that comprises a rotary element that moves under pressure of fluid flow to generate useful work which is usually the generation of electricity. Fluid may be gas or liquid or other non-solid phases. One example of a turbine is a wind turbine. When a wind turbine is mentioned in the present disclosure, the fluid concerned is the air, and wind is the flow of air. Wind turbines are commonly horizontal axis or vertical axis, although other types of design have been proposed. The present disclosure can apply to any type of turbine.

A horizontal axis wind turbine is well known to someone skilled in the art. The method of Doppler anemometry is also well known to an individual skilled in the art. It will be appreciated that LIDAR (Light Detection and Ranging) Doppler anemometry systems may employ range gated, pulsed laser beams or alternatively focused continuous wave (CW) laser beams, typically employing substantially co-located emitter and receiver optics, in order to measure velocity components of radial extent along the laser beam direction.

It will be appreciated that emitter and receiver optics do not necessarily need to be substantially co-located and that bi-static configurations may employ emitter and receiver optics substantially displaced from each other.

A person skilled in the art will be familiar with the design of horizontal axis wind turbine including a nacelle housing mounted atop a vertical tower and containing a near-horizontal axis rotating shaft driven by a rotor system attached to the nacelle at a hub from which protrude a plurality of aerodynamically designed blades. A person skilled in the art will also be familiar with pitch control systems which may rotate or pitch the blades through different angles about their longitudinal axes radiating laterally from the near-horizontal drive train axis. It is known that such systems may include a low speed shaft, gearbox and one or more high speed shafts driving generators, or alternatively that the system may be of direct drive type without need for gearbox and high speed shaft. Alternatively, it is also known that hydraulic drive train designs may be implemented within a wind turbine. A person skilled in the art will be familiar with designs where the nacelle housing may be driven to rotate or yaw around a vertical axis such that the rotor axis aligns substantially with the wind direction and the turbine may be driven to face into or away from the wind. It will be appreciated that all the aforementioned drive train types make use of control systems dependent upon wind speed and wind direction measurements and that the usual measurement method currently employed makes use of wind vane or anemometry instruments mounted on the wind turbine nacelle.

Present nacelle mounted Doppler anemometry or LIDAR systems for horizontal axis wind turbines sample only the radial line of sight wind velocity at a given point. However, the three dimensional wind velocity field variation is significant to the operation of a wind turbine. Present techniques collect wind velocity component information by use of a plurality of divergent beams but this results in collection of different velocity components at widely separated points in the incident wind field. The present techniques may make the assumption that the wind velocity field is substantially parallel and uniform. Since it is well known that substantial variation in wind field is possible across a wind turbine rotor swept area this assumption of uniformity or averaging of the wind field leads to a degradation of information resolution and precludes the possibility of detailed measurement of a variable wind velocity vector field.

Measurement of turbulence intensity at a point in space within a given time-averaging period, defined as the standard deviation of wind speed samples divided by the average of the wind speed samples within the time-averaging period, will also be subject to increased measurement error when velocity components are sampled not at the intended measurement point but substantially displaced from the intended measurement point. The standard deviation is then calculated over a data population extending in space as well as over the time-averaging period. It is noted that classical spinning cup or ultrasonic anemometry involves the collection of data substantially at a single point in space.

Various measurement systems have been proposed, in US2012/0051907 (ROGERS); GB2477529 (VESTAS); EP1460266 (MITSUBISHI); WO2011/096928 (CATCH THE WIND); US2012/0274937 (HAYS); and US2013/0162974 (DAKIN); but these all suffer from one or more disadvantages.

Therefore a new fluid velocity measurement system would be beneficial.

SUMMARY OF THE DISCLOSURE

According to a first aspect of the disclosure there is provided a measurement system comprising:
 a plurality of beam sources mounted on a turbine and arranged such that beams from the beam sources intersect at a measurement point;
 one or more receivers for measuring a Doppler shift of reflected or scattered beams;
 a processor for determining a fluid velocity at the measurement point based on the measured Doppler shift.

According to a second aspect of the disclosure there is provided a measurement method comprising:
 emitting beams from a plurality of beam sources on a turbine such that beams from the beam sources intersect at a measurement point;
 receiving a Doppler shift of reflected or scattered beams; and
 determining a fluid velocity at the measurement point based on the measured Doppler shift.

The following features may generally apply to both the system or to the method. Where apparatus integers are recited, it is understood that a method of providing and/or using those features is contemplated. Likewise, where method steps are recited, it is understood that apparatus integers that are capable of performing the method steps or which perform the method steps in use are contemplated.

A "point" will in practice be an intersection region having a size defined by the lateral size or divergence of the beams, as well as the longitudinal extent of their focus in case of Continuous Wave (CW) laser beams, or the longitudinal extent of their pulse length and range gate extents in case of pulsed, range gated laser systems.

A beam source may be anything that emits a narrow unidirectional flow of electromagnetic radiation, particles or energy.

Velocity is a three dimensional quantity, wind speed in both horizontal and vertical planes can be measured, or indeed in any other frame of reference in three dimensions.

Optionally, the measurement point is upstream of the turbine with respect to the flow direction of a fluid that drives the turbine.

Optionally, a correction factor is applied to a measured Doppler velocity to take account of any known statistical relationship indicating a difference in fluid velocity with a velocity of particles entrained in the fluid.

Optionally, the turbine is a wind turbine.

Optionally, the wind turbine is a horizontal axis wind turbine.

Optionally, one or more beam sources are mounted on or in a nacelle housing.

Optionally, one or more beam sources are mounted on or in a fixed frame extending from the nacelle housing.

Optionally, nacelle yaw angle and tower/nacelle bending are taken into account for beam steering accuracy purpose and/or for calibrating the measurements taken by the receiver.

Optionally, one or more beam sources are mounted on or in a rotor hub.

Optionally, one or more beam sources are mounted on or in a fixed frame extending from the rotor hub.

Optionally, the fixed frame comprises a shroud extending from the hub and encircling the blade stem.

The shroud may be cylindrical and may or may not include one or more bearings holding it in place with respect to the interior blade stem which may rotate (pitch) freely within the shroud and/or bearing(s).

Optionally, rotor rotation angle is taken into account for beam steering accuracy purpose.

Optionally, one or more beam sources are mounted on or in one or more rotor blades.

Optionally, the beam sources are mounted to the blade by means of straps, bolts, locking joint, magnetic fixture or bonding agent.

It will be appreciated that other mounting methods may be employed if desired.

Optionally, one or more beam sources are mounted on or in a fixed frame extending from one or more rotor blades.

Optionally, the wind turbine employs rotor blades which comprise a first pitching portion mounted on a second non-pitching blade extension portion and one or more beam sources are mounted on said second non-pitching blade extension portions at a radius from a main rotor axis which is greater than the radial extent of the rotor hub.

This increases a baseline separation of the rotor based beam sources which are thereby unaffected by blade pitch, whereas blades may pitch as required beyond the fixed extension sections.

Optionally, the rotor blades comprise a plurality of independently pitching sections Optionally, the rotor blades comprise an inner section which does not pitch.

Optionally, blade pitch variation is taken into account for beam steering accuracy purpose.

Optionally, a plurality of co-located beam source and receiver pairs are provided.

Optionally, the system further comprises one or more fixed location beam sources spaced from the turbine.

Optionally, beam sources are provided at a plurality of turbines and have their beams independently directed such that they converge or intersect at the measurement point.

Optionally, the system further comprises one or more beam sources positioned on remote vehicles such as unmanned aerial vehicles.

Optionally, the system comprises a control system for the beam sources which is arranged to select particular beams which best lend themselves to providing samples at particular positions without being intersected by the passage of the rotor blades, nacelle or tower, thereby allowing for uninterrupted measurement and freeing up any alternative beams in order that they may simultaneously be employed towards alternative measurement positions.

Optionally, the beam scanning method may change according to an operational state of the turbine allowing for the possibility of employing the rotation of the rotor blades for beam scanning when the rotor rotates but switching to an alternative measurement mode when the rotor ceases to rotate.

The rotor may cease to rotate in very low wind or when the turbine is in a maintenance or shutdown state.

Optionally, the system comprises beam steering means that can be controlled to vary the measurement point.

Optionally, the system comprises a control system which provides necessary signals to the individual beam steering or deflection systems, based upon one or more of: sensor input knowledge and calculation of relative positions of sources, component orientation and alignment information, relative position and velocity of geographic, rotor and blade pitch reference frames, yaw angles, rotor angle, blade pitch angles, rotor speed, wind velocity and/or wind direction.

Optionally, a beam source or beam source window protrudes minimally from, is moulded within or included within the wind turbine nacelle, rotor hub, blades or other components.

This means that the beam source has minimal impact upon the aerodynamics of the wind turbine components.

Optionally, the beam sources are arranged to measure a fluid velocity field at a succession of sampling or measurement points in order to provide data samples indicating the spatial variation of the fluid velocity field or its characteristics.

Optionally, a succession of Doppler velocity measurements employing intersecting beams are separated spatially and/or temporally and are combined in order to characterise the fluid velocity field in terms of turbulence intensity field, horizontal or vertical fluid veer field, horizontal or vertical fluid shear field, angle of inclination field, horizontal, lateral or vertical fluid component fields, gusts or any other features of the fluid velocity field.

Optionally, the measurements are analysed to derive a fluid density value.

Measuring and accounting for fluid density can have a number of possible applications—the fluid density governs the mass of fluid passing a turbine rotor per second which relates to the total kinetic energy passing through the turbine per second, ie the total power available in the fluid; a Doppler measurement system measures fluid velocity but may also be able to measure the fluid density according to the intensity of the reflected signals from fluid molecules or other particles. Then this information (fluid velocity field, density field in combination with measured power from current and voltage transformers of the turbine) could be provide turbine power efficiency, and for wind turbines in particular, rotor averaged power curves, aerodynamic lift/drag/torque predictions. Density measurements can be useful for measuring a turbulence intensity field, flow inclination field and other parameters.

Optionally, successive velocity measurements are employed in order to produce fluid acceleration measurements, or higher time derivatives of vector displacement allowing for the measurement of fluid acceleration field to be employed by control systems of turbines operating within a fluid.

Optionally, the measurement point is spaced from the turbine rotor plane by at least a minimum distance which is determined based on the amount of time that turbine actuation systems take to move a turbine component by a given amount; and wherein said minimum distance is dynamically adjusted based on the measured fluid velocity.

Optionally, information gathered is used for diagnostic analysis on a turbine or apparatus operating within or upon a fluid, in order to identify conditions of improved or worsened performance.

Optionally, fluid velocimetry is used in combination with other instruments, such as condition monitoring equipment in order to assist identifying change in condition of turbine components or to distinguish between condition monitoring signals arising due to abnormal fluid conditions from those due to altered component condition.

Optionally, velocimetry data is provided to a turbine control system in order to provide an alternative fluid speed or fluid direction measurement to supersede, alternate with or augment local fluid speed or local fluid direction measurements made by instruments mounted on the turbine.

The local fluid speed or fluid direction measurements could for example comprise anemometers, wind vanes or other components mounted on a nacelle of a wind turbine.

Optionally, the turbine is a wind turbine and a control system is arranged to combine the velocimetry data with inputs from additional sensors collecting one or more of: wind turbine operational data, power performance data, wind conditions data, noise data, condition monitoring data, vibration data, blade bending moment data or tower bending moment data.

This can improve wind turbine control, or feed into and inform improved wind turbine design, for reasons of enhanced safety, power performance, energy yield, output, noise control, component integrity, system integrity, component lifetime or system lifetime.

Optionally, the control system employs the available data in order to calculate and actuate altered turbine control parameters.

These turbine control parameters could include for example collective or independent blade pitch settings or nacelle yaw angles. There are hundreds of possible turbine control parameters and control settings that could be altered.

Optionally, a plurality of beam sources transmit at differing frequencies, pulse repetition frequencies or with different polarisation characteristics in order to distinguish between Doppler component measurements separated in space or time.

Optionally, a given beam frequency or pulse repetition frequency is chirped or otherwise varied in time such that detected Doppler returns may be differentiated.

Optionally, velocimetry data is employed to provide wind field mapping, which can be used for predicting output of wind farm for grid management purpose or for energy storage control purpose or for co-generation management whereby wind farm output is combined with the output of another generator, one possible object being to deliver accurate power prediction/forecasting for electricity grid management or energy trading purpose.

Optionally, velocimetry data is employed to provide wind field mapping for a wind pump where a wind turbine rotor shaft drives a hydraulic pump or compressor.

Optionally, the turbine is contained within an annular, cylindrical, conical or funnel-shaped housing.

Optionally, the housing or its mounting structure comprises one or more beam sources.

Optionally, the system includes a calibration sensor mounted on the turbine and the beam sources are arranged to be selectively directed or steered to aim at the calibration sensor for test purposes, in order to confirm the beams are successfully directed towards the position of the sensor, thereby offering evidence that the beam steering functions correctly in general.

Optionally, the system comprises a further redundant beam source which is not needed for the fluid velocity measurement which is directed such that its beam intersects with the beams emanating from at least three other beam sources; velocity measurements from said at least three other beam source being used for calibration by calculating the measured velocity vector component in the direction of the further (redundant) beam, with its further (redundant) Doppler measurement.

Optionally, the turbine is a wind turbine and the system comprises means to predict or estimate physical quantities at different points along individual wind turbine blades based on the determined relative wind velocity vector.

Optionally, the physical quantities comprise one or more of: aerodynamic angle of attack as a function of length along blade, lift or drag coefficients as a function of length along blade, torque per unit length at different positions along the blade.

Optionally, the means to predict or estimate physical quantities performs a prediction or estimation taking account of the blade shape profile and blade sensor data or blade component data.

Optionally, the blade sensor data comprises blade shape deformation sensor data

Optionally, the blade component data comprises blade flap actuator data.

Flap actuator data could include flap angle demand (a signal or value transmitted to or employed by a flap control system) or other data.

These predicted or estimated physical stresses may be used for purposes including improving power performance, or for decreasing loads, or for increasing system lifetime, or for reducing maintenance costs, or for informing future improved system design.

Optionally, active blade surfaces, blade flaps or blade pitch control devices are adjusted according to the predicted physical stresses.

Optionally, the predicted physical stresses are combined with or used in conjunction with condition monitoring systems.

Optionally, the turbine is a wind turbine and a rotor averaged wind speed is measured according to a combination of wind velocity samples collected around the rotor area.

The samples may be afforded different weightings as desired. This rotor averaging technique allows for more meaningful wind turbine power curve measurement for purpose of performance monitoring, performance warranty contractual design or claim, or other purpose.

Optionally, the turbine is a wind turbine and the wind velocity measurements are used to alter the wind turbine inclination or tilt control.

Optionally, the wind turbine axis orientation may be adjusted in order to account for varying non-horizontal wind velocity, preferably within a margin of safety to avoid the risk of blade collision against a tower.

Optionally, a rotor hub may be moved forward from a substantially horizontal axis wind turbine tower in order to allow for greater rotor axis tilt variation for matching wind conditions.

Optionally, a counter weight is provided at the rear of the nacelle to balance the moved rotor hub.

Optionally, the wind turbine is a vertical axis wind turbine.

A vertical axis wind turbine can also have various types of blades including helical design or vertically mounted aerofoil but not limited to those. The beam sources may be mounted on or in such blades and/or top of a rotor and/or on fixed base or position elsewhere. Such beams may be arranged to intersect one another every so often according to rotation angle, or one or more of the beams may be steerable so as to intersect.

Optionally, the turbine is a hydraulic turbine, tidal turbine or gas turbine.

Optionally, the beam sources and receivers comprise LIDAR beam sources and receivers.

Optionally, the beam sources and receivers comprise RADAR beam sources and receivers.

Optionally, the beam sources and receivers comprise SODAR beam sources and receivers.

Optionally, the beam sources and receivers comprise SONAR beam sources and receivers.

Optionally, the system comprises a machine learning component that can adapt a turbine or the operation of a turbine control system according to historical operational data.

With this machine learning component, a turbine can log its operational parameters and learn from historical data. The turbine can learn from its own operating history and from its own efficiency measurements to provide tailored power output predictions, or to better inform how it should adjust itself in response to a given wind field to maintain a desired power profile or output.

According to a third aspect of the disclosure there is provided a computer program product for implementing the first and second aspects. The computer program product may comprise one or more of:
- a product that comprises instructions for a control system for steering the beam sources;
- a product that comprises instructions for a turbine control system that is provided or modified in accordance with the teaching of the disclosure to receive inputs from the velocimetery measurements, make calculations and provide command signals for controlling turbine components; or
- a product that comprises instructions for anyalsing the outputs of a velocimetery measurement system and performing various calculations for making predictions and measurements as taught herein.

The computer program product may be stored on or transmitted as one or more instructions or code on a computer-readable medium. Computer-readable media includes both computer storage media and communication media including any medium that facilitates transfer of a computer program from one place to another. A storage media may be any available media that can be accessed by a computer. By way of example such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fibre optic cable, twisted pair, digital subscriber line (DSL), or wireless technologies such as infra-red, radio, and microwave, then the coaxial cable, fibre optic cable, twisted pair, DSL, or wireless technologies such as infra-red, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media. The instructions or code associated with a computer-readable medium of the computer program product may be executed by a computer, e.g., by one or more processors, such as one or more digital signal processors (DSPs), general purpose microprocessors, ASICs, FPGAs, or other equivalent integrated or discrete logic circuitry.

DETAILED DESCRIPTION

Figure 1:
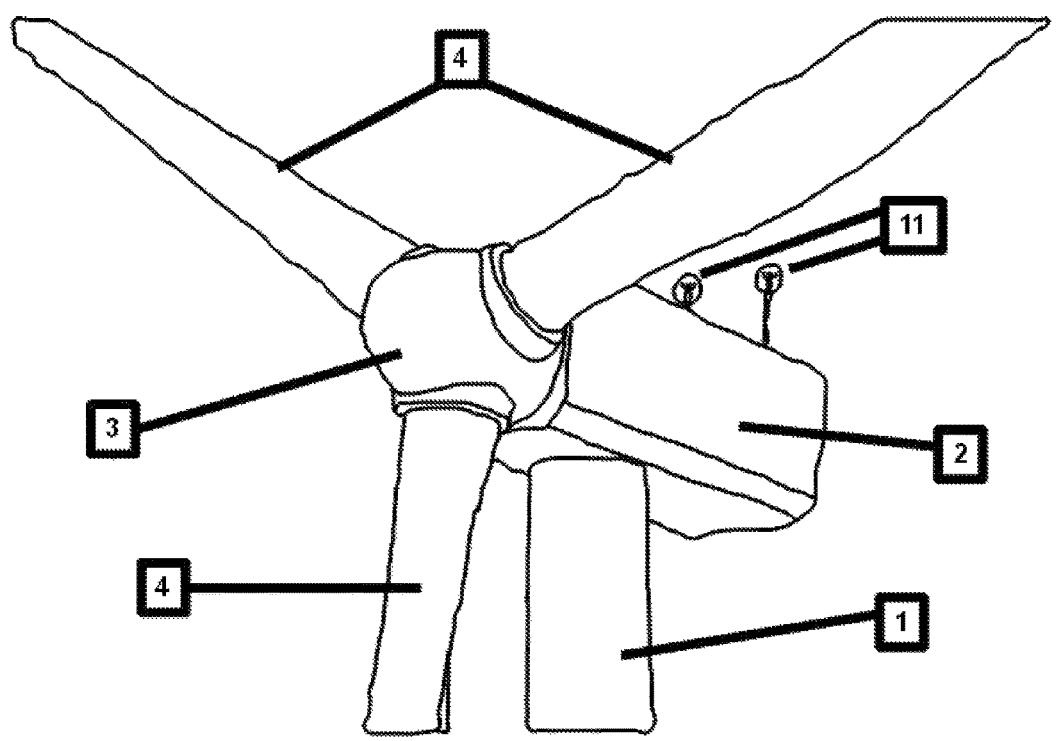
FIG. 1 shows a typical horizontal axis wind turbine.

A new sensor design will be beneficial where the design enables three dimensional wind velocity sampling at one or more points in space and that this can be achieved through the intersection or convergence of beams from spatially separated sources.

A receiver measures a Doppler shift of the reflected or scattered beams, and a processor determines a fluid velocity at the measurement point where the beams converge based on the measured Doppler shift. The beam sources may be referred to as "Doppler beam sources" where they are used as part of a Doppler measurement system.

The fluid velocity measurement can be made by beam sources mounted on the turbine. Preferably they are mounted on component parts of the turbine which can adjust their position to take account of changing direction of fluid flow. This is advantageous because the beam sources then naturally tend to point along a fluid flow axis (either upstream or downstream of the turbine).

In the example of a horizontal axis wind turbine (HAWT), the beam sources may for example be mounted on a nacelle, rotor hub or turbine blade(s); or on associated frames or extension components as described elsewhere.

For example, a HAWT nacelle or rotor hub is typically controlled (by a set of yaw motors) so as to point substantially into the wind, so if all beam sources are mounted on these components one can conveniently avoid the situation where the HAWT (support) tower would obscure potential measurement points from the beam sources, receivers or transceivers.

There can be another advantage of employing beam sources and receivers in the reference frame of the rotor on the grounds that this is the reference frame of the blades which means that measurements made within this reference frame give a "direct measurement" of the wind velocity relative to any given blade section. This relative velocity determines the angle of attack and relative wind speed which governs the lift coefficient and drag coefficient of the blade element.

By using scanning techniques, within or without the rotating reference frame of the rotor hub, it is possible to sequentially employ simultaneously converging beams to sample three dimensional wind velocity at one or more points, where the beam sources are all based upon the wind turbine nacelle, rotor hub or blades but where the beam sources are substantially separated from one another.

The separation of the Doppler beam sources is important in order to adequately resolve the three orthogonal velocity components. It will be appreciated that three mutually nonparallel beams are sufficient to form a basis for specifying a three dimensional vector.

Therefore three non-parallel Doppler measurements of radial speed of an object may be combined to specify the three-dimensional velocity of the object. Three non-parallel Doppler measurements at a beam intersection point therefore provide three-dimensional velocity measurement of aerosol or other particle velocity which may be taken to indicate the wind velocity at that measurement point, the aerosol or other particle being carried by the wind at or near the local wind velocity.

Employing beam sources on the wind turbine nacelle, rotor hub or rotor blades means that beam sources yaw or rotate about a vertical axis as does the wind turbine nacelle and rotor assembly such that it faces generally into the wind. This enables the three-dimensional measurement or sampling of the incident wind velocity vector field ahead of the turbine and its blades.

Similarly beam sources can be employed to measure at one or more points behind the wind turbine, at points within its wake, or in fact at any chosen position relative to the wind turbine.

It could be possible to employ three orthogonal beams originating from points on the rotor hub, radial extension of the hub or blades, the blades themselves, or an associated frame such that the intersection point lies at a point on the rotor axis of rotation at some fixed range in front of the turbine. This arrangement enables the direct measurement of the orthogonal wind velocity vector components and could be achieved with staring beams and no need for beam steering. The range at which such beams could be made to intersect orthogonally would be limited by the extent of the rotor diameter. Measurements at greater ranges could be obtained also with staring intersecting beams, being of fixed position within the frame of reference of the rotor, where the beams converge with acute angles less than 90 degrees.

Wind turbine control systems and control philosophy demand accurate incident wind speed and incident wind direction measurement inputs. However, wind speed and direction measurements are typically provided by nacelle mounted wind vanes, cup anemometers or ultrasonic anemometers. Correction factors or transfer function parameters are used to transform the nacelle measurements into upwind measurement estimates.

The position of such instruments on the nacelle, behind the rotor and subject to wind flow streamlines around the nacelle including bow wave and wake effects, gives rise to errors in estimating the upwind quantities. Therefore an additional advantage of a nacelle LIDAR system, employing converging beams for improved measurement accuracy, is to provide direct more accurate measurement of the upwind quantities, thus enabling more accurate adherence to the wind turbine control philosophy.

Wind turbine yaw misalignment due to inaccurate wind direction measurement can cause significant power losses. Therefore improved wind direction data, provided by more accurate nacelle mounted LIDAR employing converging beams, can increase wind turbine output by offering improved yaw alignment with the wind direction.

Nacelle mounted LIDAR enables characterisation of future wind conditions incident at the wind turbine and rotor through measurements made upwind of the turbine. More accurate nacelle LIDAR measurements, by use of converging beams, can enable more effective assessment of future wind conditions, thereby improving the effectiveness of possible control system response.

Advance knowledge of extreme wind conditions such as gusts or extreme wind shear events allows a wind turbine control system to adjust control parameters in order to avoid the associated increased loads on wind turbine components. Therefore more accurate nacelle mounted LIDAR employing converging beams enables more effective wind turbine load control.

Advance knowledge of incident wind conditions may be employed by predictive collective or independent pitch control. Therefore more accurate nacelle mounted LIDAR employing converging beams enables more effective pitch control.

In order to resolve three dimensional wind velocity components at a specific point within the wind field it is necessary to intersect at least three beams. More than three beams may be provided in order to allow for simultaneous multiple measurement. In other words, a plurality of measurement points may be measured at any one time.

If the beams are almost parallel then they are essentially measuring the same radial line of sight velocity component and little or no information is obtained on the lateral velocity components. Therefore it is preferred that the beams will have large angle between them and that they should converge or intersect at a given measurement point in space, which can be achieved by large spatial displacement between their respective beam sources along with suitable beam direction control.

The disclosure comprises a plurality of beams emitted from beam sources which are within or mounted on those horizontal axis wind turbine components which yaw or rotate around a vertical axis as the wind turbine is controlled to face into the wind.

Such components include the wind turbine nacelle, rotor hub or rotor blades. The beam sources are substantially displaced from one another and the beams are aimed towards the measurement point such that they intersect or converge at the measurement point, thereby enabling radial Doppler velocimetry along at least three non-parallel axes in order to reconstruct the three-dimensional wind velocity at the measurement point. Each beam measurement range may be independently controlled by use of focusing optics or by use of range gate timing.

Preferably the beam source is a laser. Each beam source may be substantially co-located with a receiver-detector system allowing radial velocity measurement along the beam axis and at the measurement point.

Beam sources can be of a number of different types. In one embodiment doped optical fibre lasers may be employed. These may be chosen to operate with wavelength and power which is considered safe for the human eye. However it is appreciated that other types of laser and optics could be employed including semiconductor lasers, pumped optical cavity lasers, mirrors, lenses, etc.

It will be appreciated that a laser source may or may not be co-located with one or more laser beam telescopes. For instance it would be possible to transmit and/or amplify laser beams via system of mirrors or optical fibres from wind turbine base or nacelle through to wind turbine rotor hub and also into wind turbine blades. Components such as optical slip ring or other may be employed in the system if required. Therefore laser beams may be directed or transmitted from telescopes or optical windows at any required location on or within the wind turbine subcomponents such as base/transition piece, tower, nacelle, rotor hub, rotor blades, etc.

Radiation from the laser source may be replicated or split in order to provide an optical reference of known frequency which can be mixed with or interfered with the reflected beam. The reflected beam is reflected from particles, aerosols or molecules within the air which are considered to be travelling with the same velocity as the wind. Mixing or interference of the reflected beam frequency with the reference frequency enables the Doppler shift in frequency to be measured. The reference frequency or the reflected frequency may also be shifted by a known amount prior to mixing. The Doppler shift in frequency indicates the relative velocity of the reflecting particle, aerosol or molecule. This principle is used to infer the wind velocity component along a given Doppler beam measurement line of sight.

In case there is a measured or known statistical relationship indicating a difference in wind velocity with velocity of such particles, aerosols or molecules borne on the wind then a corresponding correction factor may be applied to the measured Doppler velocity in order to correct the measurement towards the true wind velocity. A similar technique could be employed for turbines which operate in liquid or other fluids.

A novelty of this disclosure lies within the fact that nacelle or rotor mounted beam sources are made to converge at the measurement point allowing co-located measurement of independent components of the wind velocity vector, whereas existing nacelle mounted LIDAR Doppler velocimetry methods employ diverging beams which sense the independent wind velocity components at different locations in space, or else simply collect data on the radial wind speed component alone using a single beam.

An advantage of employing convergent beams from beam sources on the nacelle or rotor is that accurate three-dimensional wind velocity samples can be measured upwind of the wind turbine rotor, irrespective of the turbine yaw position.

A "point" will in practice be an intersection region having a size defined by the size or focus of the beams. For a Continuous Wave (CW) laser system an adjustable focusing system would normally be employed in order to make Doppler measurement at a given focus range; or where a pulsed laser system is used the pulse length and timing gate resolution will determine the range-resolution at which Doppler measurement can be made at a series of different ranges (for a series of timing gates according to the speed of light travelling to and back from the measurement range).

In air, normally a pulsed system would be employed over long range (e.g. 50 m to some kilometers) whereas a CW system could be better employed over short range (e.g. less than 100 m) since the range resolution of CW system can be very good at low range—of order 1 meter or less, while typical pulsed systems would have range resolution perhaps around 10 meters.

This means that a CW system could be very good for close in accurate measurements to be used for quick pitch adjustments or for feeding into active surface control such as controllable blade flaps.

These considerations depend on the laser wavelength and/or the pulse or range gate wavelength. We are normally talking about 1.5 to 2 micrometer wavelength which is "eye safe".

In one embodiment of the disclosure the Doppler beams may be deliberately steered such that they be made to intersect at various chosen measurement points. This may be with or without deliberate dwell times of the beam scanning system/steering system per measurement point. Through successive measurements this allows the sampling of the varying wind velocity field at different relative upwind ranges, heights and lateral displacements from the wind turbine rotor hub centre. This measurement information may be used to feed into the wind turbine control system for reasons including improved adherence to wind turbine control philosophy, improved wind turbine performance monitoring, improved yaw control, anticipatory or predictive control as well as load management or protection against extreme events within the incident wind velocity field.

In another embodiment of the disclosure one or more fixed beams relative to the rotor hub sweep out one or more cones as the rotor rotates and such beams are intersected by fixed or scanning beams emanating from telescopes mounted on/in the nacelle/tower/base, or elsewhere. For instance if the rotor is rotating slowly at just 6 rpm (one rotation every 10 seconds) then one of ten independent beams fixed relative to the rotor hub could be arranged to intersect any given point on their swept cone once every second giving a measurement frequency of 1 Hz. In case of additional fixed or scanning beams intersecting the same point then it would be possible to reconstruct a three dimensional wind velocity vector at that measurement point.

The means of beam scanning may for example employ a rotating turret with optical window where the beam is scanned by means of system of one or more rotating and/or fixed mirrors and/or by means of one or more rotating and/or fixed prism/lens. However, it will be appreciated that other methods of beam steering can be employed.

It is possible to measure a three-dimensional map of the wind field by arranging for a series of measurement samples to be collected at a chosen set of points across the field of measurement. In a preferred embodiment three scanning beams emanating from the nacelle and/or hub and/or rotor blades are individually steered such that they intersect at the same point in time and space (at the measurement point) and that this process is repeated at successive measurement points sampled across the chosen measurement field.

In one embodiment a set of measurement points are chosen such that they are as close to the rotor plane as possible but separated by a distance which is calculated to allow pitch systems or other actuators (e.g. active surface/ flaps actuators) to prepare for the imminent wind field about to impinge on the blades.

In one embodiment a set of measurement points are chosen so as to sample the wind field at a significant distance in front of the wind turbine rotor, such as at 2.5 rotor diameters distance in accordance with the notion that measuring at such a distance in front of the rotor may be considered a "free stream" measurement.

In one embodiment the scanning points are arranged so as to densely sample the wind field across the entire rotor in order to provide measurements which contribute to a rotor averaged wind speed measurement for rotor averaged power curve assessment or other purpose.

In one embodiment sets of measurement points may be collected at multiple ranges in order to check for the persistence of potentially damaging wind features such as extreme turbulence, localised eddies, gusts, or other features with the potential to enable warning flags of increasing severity in case a damaging feature persists and approaches the wind turbine, and eventually an alarm to initiate shutdown or alternative protective measures such as through pitch control.

In general the disclosure allows for the measurement at multiple ranges and points throughout the incident fluid field in order to simultaneously characterise the fluid field for multiple different purposes.

Wind maps may be constructed which are planar sections through the overall wind field such as a plane parallel to the rotor plane at one or more distance in front of the rotor. In general a wind velocity map may include a plurality of samples throughout the incident or surrounding wind field.

In general a scanning system that controls the beam sources is programmable such that any set of measurement points may be successively and/or simultaneously sampled for one or more specific purposes.

The principles of the disclosure are not limited to measurements upstream of a turbine and may equally be applied in measuring behind/downstream of the turbine in order to characterise wake conditions, which may impinge on another turbine.

Wake information collected by this means may allow for the deflection, diversion or deliberate alteration of the wake (or wake conditions such as turbulence) such that it could be deflected or directed away from other turbines.

Very accurate milliradian beam steering of lasers is possible with existing equipment, employing galvanometers, MEMS gratings, micro-mirrors, decentred lens arrays, rotating wedges or other beam steering systems.

When mounting a LIDAR steering system on/in a wind turbine nacelle then the nacelle motion would need to be measured and accounted for—for example using MEMS accelerometers or other equivalent methods. Similarly, when mounting on/in the rotor hub then rotor rotation angle also needs to be measured and taken into account; and when mounting on a pitching blade section then blade pitch also needs to be accounted for. If a blade section is also flexing then further sensing or beam steering correction may be required.

Multiple transformations/corrections can be applied to account for all possible degrees of motion, and are combined into a resultant command signal for the beam steering actuators whatever they may be.

In one embodiment the design of hub and blade connection is itself modified and a fixed, non-pitching extension piece is inserted between the hub and the blade mounting point beyond which the blade is permitted to pitch. This design enables the beam sources to be mounted on the rotor at substantially greater radii from the rotor rotation axis whilst avoiding being subject to blade pitch motion which could affect beam steering capability.

The large radii from the rotor rotation axis enables pairs of such sources to be separated with large baseline, thereby facilitating improved three-dimensional velocity measurement through resolution of orthogonal wind velocity components. This design may also benefit from the possible use of shorter blades required to provide a given torque.

In another example embodiment the wind turbine has three blades and each pitching blade is mounted on a fixed, non-pitching extension piece with the three beams each staring in a fixed direction with respect to the rotor reference frame such that they intersect substantially orthogonally on the rotor axis. This design enables a single three-dimensional velocity measurement at a fixed location within the frame of reference of the rotor. Additional beams can be intersected at different fixed positions within the reference frame of the rotor, both on the rotor axis itself and displaced from the rotor axis. This arrangement can conveniently gather three-dimensional measurements of the extended wind velocity field ahead of the wind turbine rotor, with passive scanning by making use of the rotor rotation.

In one embodiment the measurement locations can be fixed or steered such that they are aimed at points in the wind field anticipated to engage imminently with a wind turbine blade, thus contributing to the blade tip speed control or predictive blade pitch control. In this case it may be beneficial to employ additional Doppler beam sources mounted at the rear of the wind turbine nacelle, on or within the top, bottom or sides of the nacelle housing, as well as rotor hub or blade mounted beams converging at the measurement point.

FIG. 1 shows components of a typical horizontal axis wind turbine including tower 1, nacelle 2, rotor hub 3, blades 4 and nacelle mounted anemometry 11.

Figure 2:
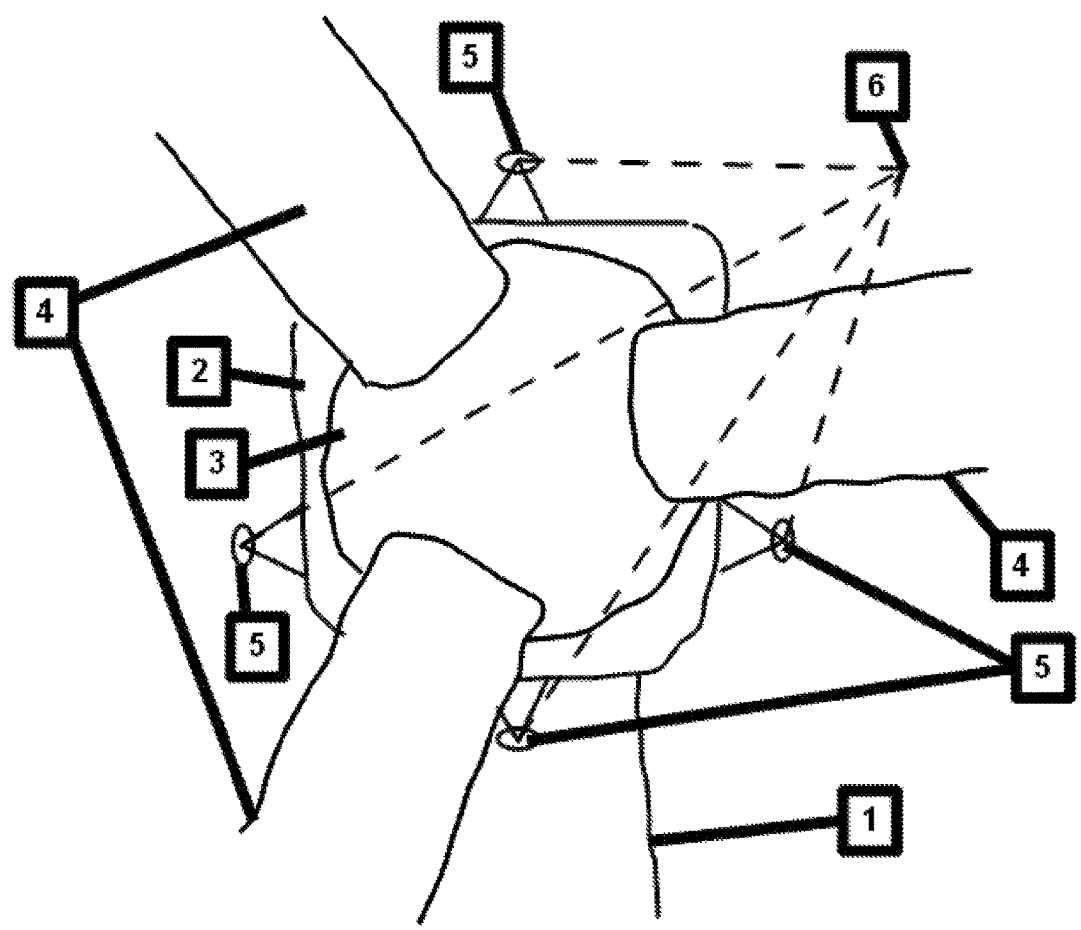
FIG. 2 shows a front view with convergent beam sources mounted on the nacelle.

FIG. 2 illustrates the front view of the wind turbine which is presented to the wind, and shows an example of how a plurality of Doppler beam sources 5 could be arranged to be mounted on the top, bottom and sides of the nacelle 2 and that it could be possible to arrange their beams to intersect at a given measurement point 6.

Figure 3:
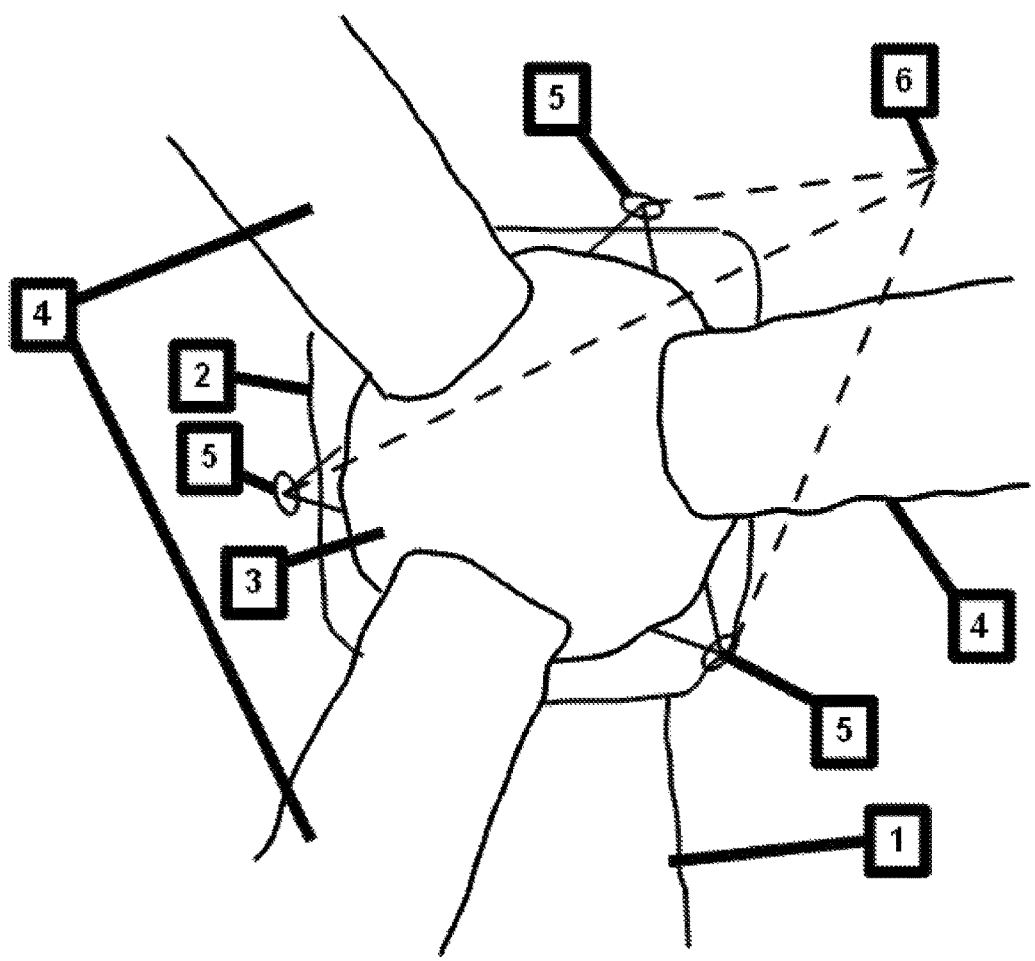
FIG. 3 shows a front view with convergent beam sources mounted on the hub.

FIG. 3 again shows the front view of the wind turbine but where a plurality of Doppler beam sources are mounted on the rotating rotor hub 3 in order to avoid obstruction of the beams by the passing rotor blades 4 when the beams are arranged to intersect at a given measurement point 6.

Figure 4:
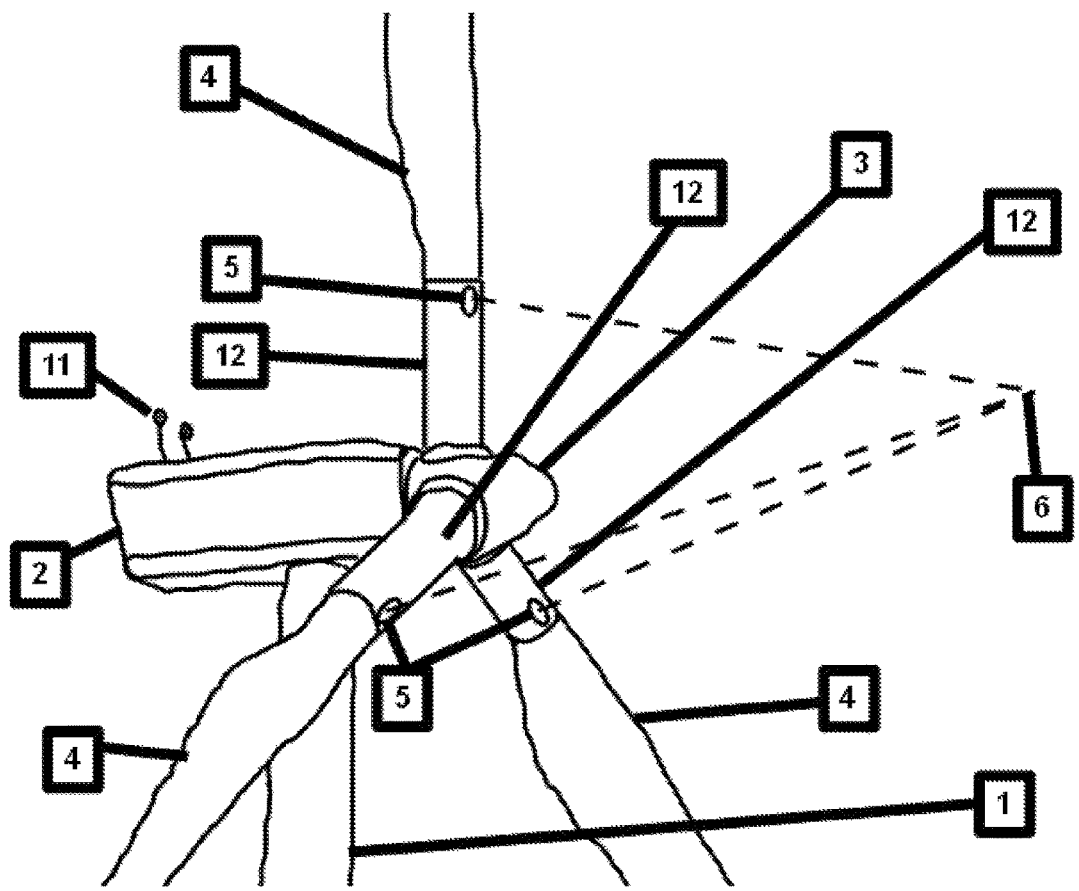
FIG. 4 shows convergent beam sources mounted on non-pitching extension pieces between hub and blades.
Figure 5:
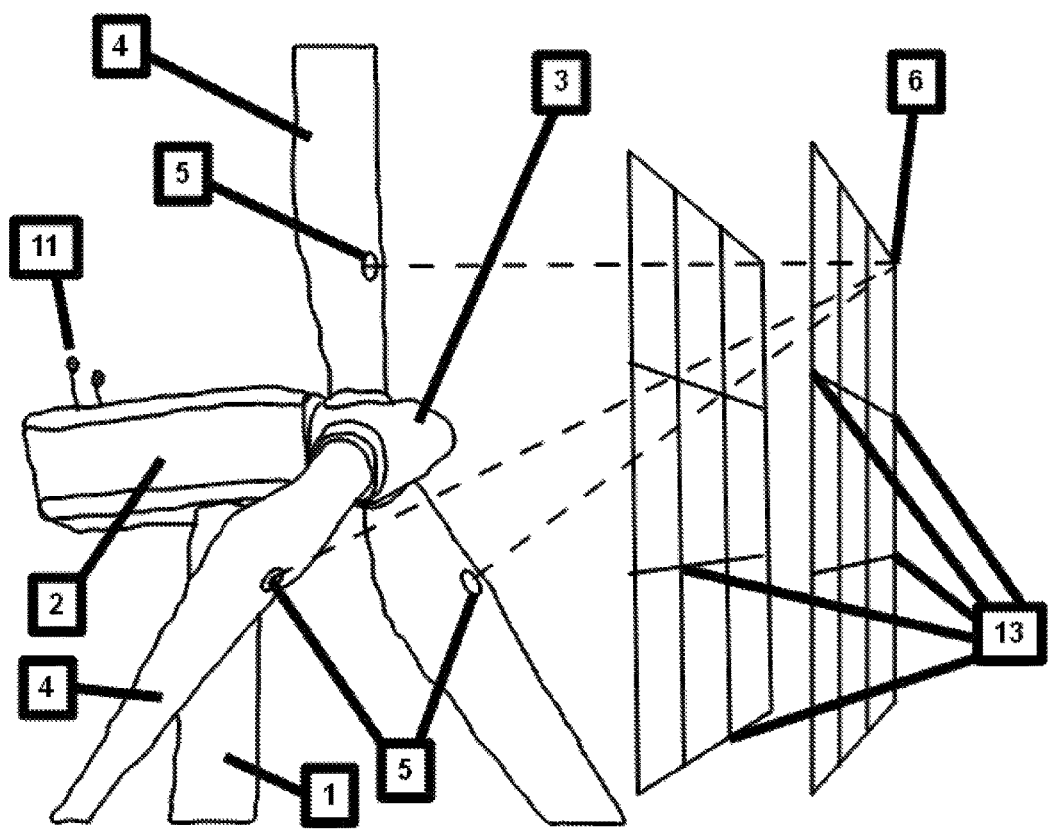
FIG. 5 shows convergent beam sources within the pitching blades themselves along with a series of measurement points sampling the incident wind field.

FIG. 4 shows an example involving a new method of blade mounting where the blade mounting points are not at the rotor hub itself but at the end of cylindrical or alternatively shaped tubing 12 extending radially outward from the rotor hub 3 and enabling the positioning of Doppler beam sources 5 on the rotor but with base line separation greater than the rotor hub diameter. Employing the fixed, notpitching extension tube sections 12 ensures that the Doppler beam sources do not rotate additionally around the pitch axis which could hinder or complicate the intersection of their beams at the measurement point FIG. 5 illustrates the possibility of scanning the beams in order that they successively and simultaneously converge at a series of measurement points which can be arranged in a regular grid or otherwise and may be at different ranges in front of the wind turbine. In this figure the beam sources are shown to be mounted on or within the pitching blades themselves implying that blade pitch, as well as rotor rotation, would need to be accounted for in scanning.

Figure 6:
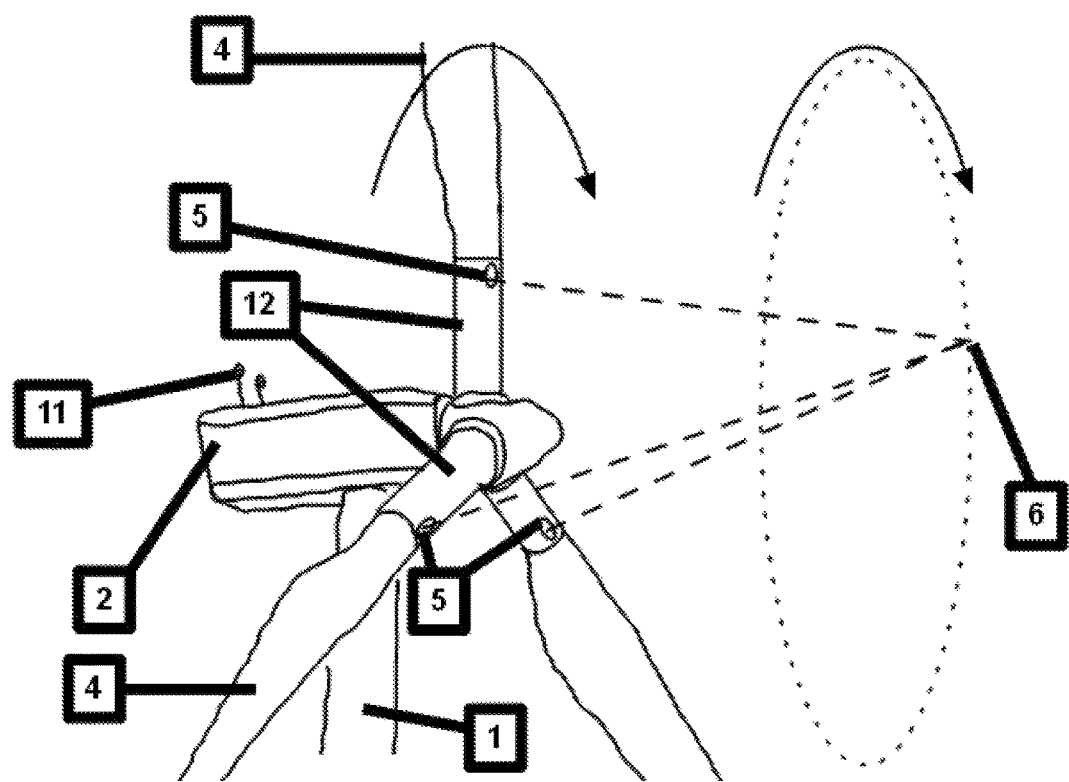
FIG. 6 shows the rotation of the rotor being employed to scan a circular locus with convergent beam sources.

FIG. 6 illustrates a scanning method which makes use of the rotation of the rotor in which case it is possible to converge the beams at a fixed point relative in the frame of reference of the rotor hub but that this allows successive data collection at numerous points on a circular locus.

Figure 7:
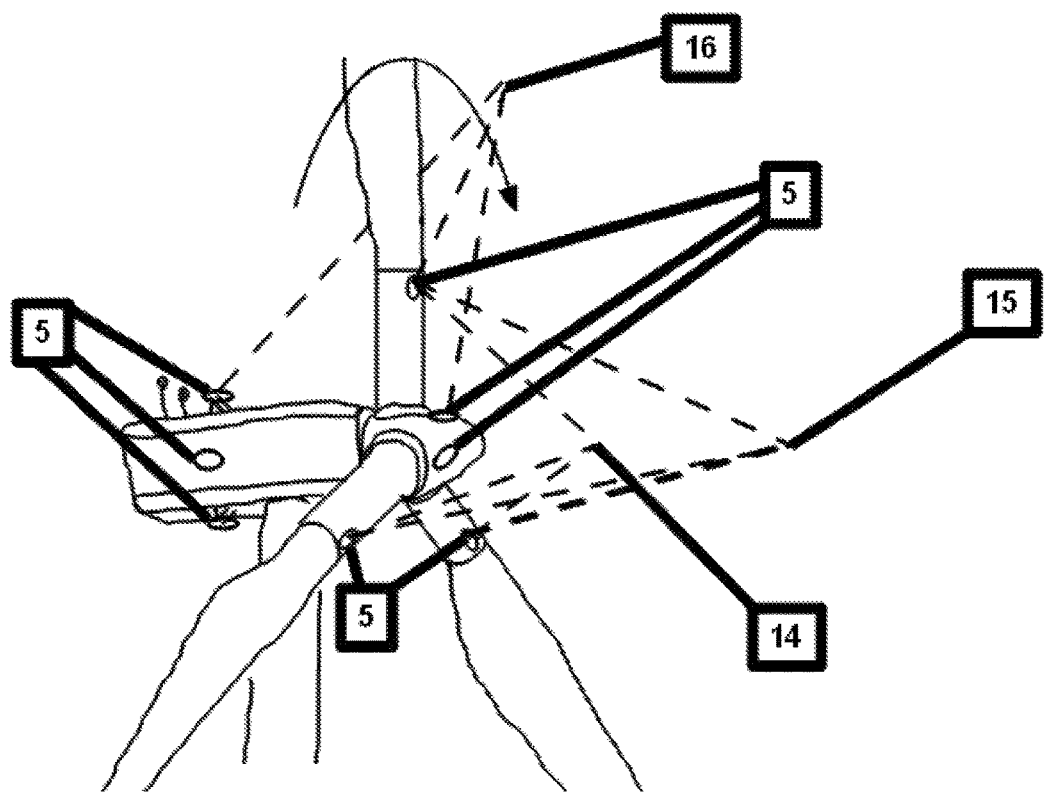
FIG. 7 shows direct Doppler velocimetry measurement of orthogonal wind velocity components as well as the use of multiple convergent Doppler beam sets to simultaneously measure at different locations including wind velocity impinging imminently at a rotor blade.

FIG. 7 illustrates the possibility of employing multiple fixed beams from sources 5 on the rotor hub or extensions thereof which may intercept orthogonally at a point 14 on the rotor axis, or converge with acute angles further upwind at a point 15 also on the rotor axis, or that fixed or scanning beams may be made to intersect at points 16 displaced from the rotor axis which may or may not be points in the incident wind field which may imminently be engaged by a blade. In the case where measurement point 16 is close in to the rotor blade plane then it could be beneficial to employ further beams from sources mounted toward the rear of the nacelle either on top, below or on the side of the nacelle housing, in order to adequately resolve the component of wind velocity parallel to the rotor axis.

Various improvements and modifications can be made without departing from the scope of the present disclosure. For example, it will be appreciated that many different beam source mounting points, frames or inclusion points are possible within the claims of this disclosure. The figures shown are just a few examples.

The invention claimed is:

1. A measurement system comprising:
   a plurality of beam sources mounted on a single turbine and arranged such that beams from the beam sources intersect at a measurement point;
   one or more receivers for measuring a Doppler shift of reflected or scattered beams; and
   a processor for determining a fluid velocity at the measurement point based on the measured Doppler shift.

2. The system of claim 1, wherein the turbine is a horizontal axis wind turbine, a vertical axis wind turbine, a wind-driven pump, or a wind-driven compressor.

3. The system of claim 2, wherein one or more beam sources are mounted:
   (i) on or in a nacelle housing or on or in a fixed frame extending from the nacelle housing; and/or
   (ii) on or in a rotor hub; and/or
   (iii) on or in one or more rotor blades or in a fixed frame extending from one or more rotor blades.

4. The system of claim 3, wherein one or more of:
   (i) nacelle yaw angle;
   (ii) tower bending;
   (iii) nacelle bending;
   (iv) rotor rotation angle;
   (v) blade bending;
   (vi) blade pitch angle; and
   (vii) rotor tilt angle
   are taken into account for beam steering accuracy purpose and/or for calibrating the measurements taken by one or more of the receivers.

5. The system of claim 2, wherein:
   the turbine employs rotor blades which comprise a first pitching portion mounted on a second non-pitching blade extension portion and one or more beam sources are mounted on said second non-pitching blade extension portions at a radius from a main rotor axis which is greater than a radial extent of a rotor hub;
   the rotor blades comprise a plurality of independently pitching sections;
   the rotor blades optionally comprise a plurality of independently pitching sections; and
   blade pitch variation is taken into account for beam steering accuracy purpose.

6. The system of claim 1, wherein a plurality of co-located beam source and receiver pairs are provided.

7. The system of claim 1, wherein beam sources are provided at a plurality of turbines and have their beams independently directed such that they converge or intersect at the measurement point.

8. The system of claim 3, comprising a beam source control system which is arranged to select particular beams which best lend themselves to providing samples at particular positions without being intersected by a passage of the rotor blades, nacelle or tower, thereby allowing for uninterrupted measurement and freeing up any alternative beams in order that they may simultaneously be employed towards alternative measurement positions.

9. The system of claim 8, wherein the system is configured to change according to an operational state of the turbine allowing for the possibility of employing the rotation of the rotor blades for beam scanning when the rotor rotates but switching to an alternative measurement mode when the rotor ceases to rotate.

10. The system of claim 1, comprising a beam steerer that can be controlled to vary the measurement point, the beam steerer comprising a control system which provides necessary signals to the beam steerer, based upon one or more of: sensor input knowledge and calculation of relative positions of sources, component orientation and alignment information, relative position and velocity of geographic, rotor and blade pitch reference frames, yaw angles, rotor angle, blade pitch angles, rotor speed, wind velocity and/or wind direction.

11. The system of claim 1, wherein the beam sources are arranged to measure a fluid velocity field at a succession of sampling or measurement points in order to provide data samples indicating the spatial variation of the fluid velocity field or its characteristics.

12. The system of claim 11, wherein a succession of Doppler velocity measurements employing intersecting beams are separated spatially and/or temporally and are combined in order to characterise the fluid velocity field in terms of turbulence intensity field, horizontal or vertical fluid veer field, horizontal or vertical fluid shear field, angle of inclination field, horizontal, lateral or vertical fluid component fields, gusts or any other features of the fluid velocity field.

13. The system of claim 12, wherein the measurements are analysed to derive a fluid density value.

14. The system of claim 2 wherein a control system is arranged to combine velocimetry data with inputs from additional sensors collecting one or more of: wind turbine operational data, power performance data, wind conditions data, noise data, condition monitoring data, vibration data, blade bending moment data or tower bending moment data, and wherein the control system employs the available data in order to calculate and actuate altered turbine control parameters.

15. The system of claim 1, wherein velocimetry data is employed to provide wind field mapping, which can be used for predicting output of wind farm for grid management purpose or for energy storage control purpose or for co-generation management whereby wind farm output is combined with the output of another generator, one possible object being to deliver accurate power prediction/forecasting for electricity grid management or energy trading purpose.

16. The system of claim 2, wherein a rotor averaged wind speed is measured according to a combination of wind velocity samples collected around the rotor area.

17. The system of claim 2, wherein:
the fluid velocity measurements are used to alter a wind turbine inclination or a wind turbine tilt control;
the wind turbine axis orientation may be adjusted in order to account for varying nonhorizontal wind velocity, preferably within a margin of safety to avoid the risk of blade collision against a tower; and
a rotor hub may be moved forward from a substantially horizontal axis wind turbine tower in order to allow for greater rotor axis tilt variation for matching wind conditions.

18. The system of claim 1, wherein the beam sources and receivers comprise LIDAR beam sources and receivers, RADAR beam sources and receivers, SODAR beam sources and receivers, or SONAR beam sources and receivers.

19. A measurement method comprising:
emitting beams from a plurality of beam sources mounted on a single turbine such that beams from the beam sources intersect at a measurement point;
receiving a Doppler shift of reflected or scattered beams; and
determining a fluid velocity at the measurement point based on the measured Doppler shift.

20. A computer program product comprising:
(i) instructions for receiving data from one or more receivers for measuring a Doppler shift of reflected or scattered beams, and for determining a fluid velocity based on the measured Doppler shift;
(ii) instructions for a control system for steering beam sources;
(iii) instructions for a turbine control system to receive inputs from the velocimetry measurements, make calculations and provide command signals for controlling turbine components; and
(iv) instructions for analysing the outputs of a velocimetry measurement system and performing various calculations for making predictions and measurements.

* * * * *